(No Model.)
J. L. MITCHELL.
LANDING CATCH FOR MINING CAGES.
No. 377,402. Patented Feb. 7, 1888.
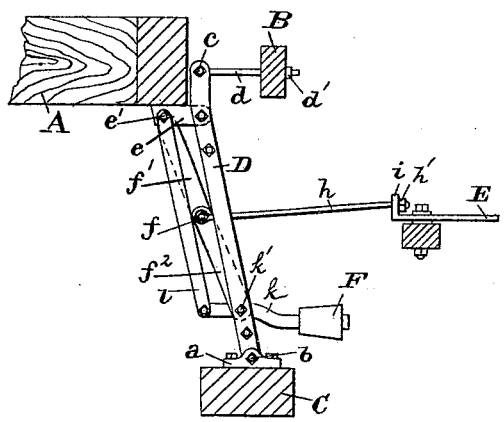
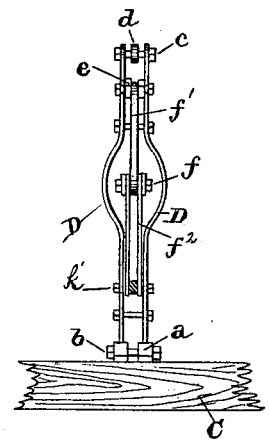
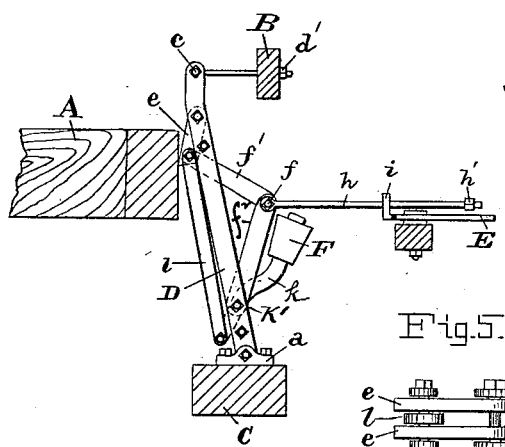
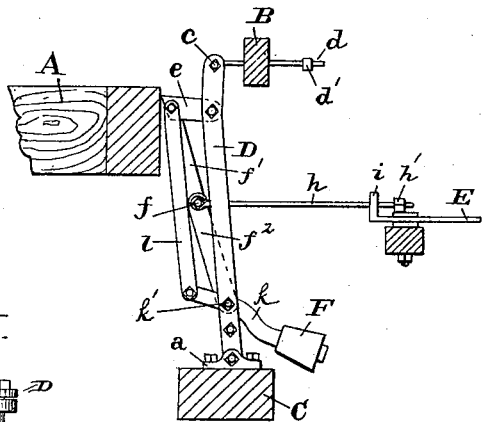
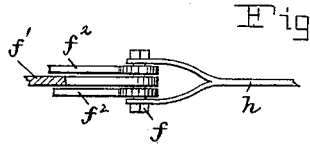
Witnesses:
A. C. Eader
John E. Morris.
Inventor
Jonas L. Mitchell,
By Chas. B. Mann.
Attorney

UNITED STATES PATENT OFFICE.

JONAS L. MITCHELL, OF LOGAN, OHIO.

LANDING-CATCH FOR MINING-CAGES.

SPECIFICATION forming part of Letters Patent No. 377,402, dated February 7, 1888.

Application filed June 10, 1886. Renewed June 11, 1887. Serial No. 241,024. (No model.)

*To all whom it may concern:*

Be it known that I, JONAS L. MITCHELL, a citizen of the United States, residing at Logan, in the county of Hocking and State of Ohio, have invented certain new and useful Improvements in Landing-Catches for Cages of Mine-Shafts, of which the following is a specification.

My invention relates to a landing-catch for elevators or cages in mine-shafts. The device serves to sustain the cage at the landing.

In the accompanying drawings, which illustrate the invention, Figure 1 is a side view of the catch, showing it supporting the cage. Fig. 2 is a view of the catch, showing the front parts, except the weight-rods $l$. Fig. 3 is a side view of the catch, showing the cage descending. Fig. 4 is a side view of the catch, showing the cage ascending and about to make a stop at a landing. Fig. 5 is a view of the top of the catch. Fig. 6 is a top view of the toggle and operating-rod $h$.

The letter A designates the cage of the elevator; B, a piece of timber fixed at a landing of a mine-shaft; C, a piece of timber fixed in the shaft just below the landing. A base-plate, $a$, is secured to the timber C, and two upright bars, D, are pivoted by a bolt, $b$, to the base-plate. These bars stand upright, and, being pivoted at their lower ends, may be inclined more or less from a perpendicular position. At the extreme upper ends these bars have a connecting-bolt, $c$, attached to which is a rod, $d$, which extends horizontally and passes loosely through the piece of timber B at the landing. This rod has a nut, $d'$, on its end, and serves to stop or limit the two upright bars D from a too great inclination. Cage-supporting arms $e$ are pivoted to the upright bars. One or more such arms may be used. In the present instance two are employed. An elbow-lever or toggle-joint has a bolt, $f$, for its joint. The upper link, $f'$, of the toggle is united by a pivot-bolt, $e'$, to the cage-supporting arms $e$, and the lower links, $f^2$, are united by a pivot-bolt, K′, to the two upright bars D. An operating-rod, $h$, has one end connected with the joint-bolt $f$ of the toggle, and extends horizontally to a pull-bar, E. This operating-rod serves to relax the toggle-joint to the position shown in Fig. 3, and thereby turn down the cage-supporting arms $e$ to permit the cage A to descend.

The pull-bar E has movement and is to connect with any suitable means for imparting motion to it. The means is not shown here, because this invention relates to the catch. The pull-bar E at its end has an upturned flange, $i$, with a hole in it, and the operating-rod $h$ passes loosely through said hole, and on its end has a nut, $h'$. This construction allows the pull-bar to be pushed toward the catch without thereby moving the rod $h$, but insures that when pulled in a direction away from the catch it will draw the said rod and relax the toggle.

Means are necessary to straighten out the toggle and raise the cage-supporting arms $e$. To accomplish this a weight, F, and levers are employed. The weight is mounted on a lever, $k$, also pivoted on a bolt, $k'$, on the upright bars D. One rod, $l$, is employed (or, if preferred, two may be used) to connect the cage-supporting arms $e$ with the weight-lever $k$. When the cage A descends, and to allow it to pass, the arms $e$ are turned down and the weight F is elevated. Upon the cage passing below, the arms $e$ are again raised by the downward movement of the weight. When the cage A ascends, the catch, being pivoted by the base-bolt $b$, is pushed to one side or away from the cage, (see Fig. 4,) and the stop-rod $d$ and operating-rod $h$ are both forced endwise through their loose-fitting bearings.

From the foregoing it will be seen, first, that the weight F, lever $k$, and rod $l$ raise the cage-supporting arms $e$; and, second, the toggle-joint sustains said arms.

Having described my invention, I claim and desire to secure by Letters Patent of the United States—

1. A landing-catch for cages of mine-shafts, having, in combination, upright bars D, pivoted at their lower ends, a stop-rod, $d$, at the upper end, cage-supporting arms $e$, pivoted to the upright bars, a toggle-joint having one of its links united to the cage-supporting arms, an operating-rod connected with the toggle, and a weighted lever suitably connected with the cage-supporting arms, as set forth.

2. A landing-catch for cages of mine-shafts, having, in combination, upright bars D, cage-supporting arms e, pivoted to the upright bars, a toggle-joint having one of its links united to the cage-supporting arms, a pull-bar, E, a weighted lever suitably connected with the cage-supporting arms, and an operating-rod attached by one end to the toggle and having the other end passed loosely through a connection on the pull-bar, as set forth.

3. A landing-catch for cages of mine-shafts, having, in combination, upright bars D, cage-supporting arms e, pivoted to the upright bars, a toggle-joint having one of its links united to the cage-supporting arms, an operating-rod connected with the toggle, and a weighted lever suitably connected with the cage-supporting arms, as set forth.

In testimony whereof I affix my signature in the presence of two witnesses.

J. L. MITCHELL.

Witnesses:
H. JASPER,
JOHN WRAITH.